(12) United States Patent
Hirose

(10) Patent No.: US 7,840,245 B2
(45) Date of Patent: Nov. 23, 2010

(54) SUPERCONDUCTIVE CABLE

(75) Inventor: Masayuki Hirose, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 777 days.

(21) Appl. No.: 11/791,961

(22) PCT Filed: Oct. 31, 2005

(86) PCT No.: PCT/JP2005/020019

§ 371 (c)(1),
(2), (4) Date: May 31, 2007

(87) PCT Pub. No.: WO2006/059447

PCT Pub. Date: Jun. 8, 2006

(65) Prior Publication Data

US 2008/0090732 A1 Apr. 17, 2008

(30) Foreign Application Priority Data

Dec. 2, 2004 (JP) ............................. 2004-350327

(51) Int. Cl.
*H01B 12/00* (2006.01)
(52) U.S. Cl. .................. 505/231; 505/230; 505/232; 505/704; 505/705; 174/125.1; 174/15.4; 174/15.5
(58) Field of Classification Search ......... 505/230–232, 505/430–431, 704–706; 174/15.4, 15.5, 174/125.1; 29/599
See application file for complete search history.

(56) References Cited

U.S. PATENT DOCUMENTS 5,932,523 A * 8/1999 Fujikami et al. ............ 505/231

FOREIGN PATENT DOCUMENTS

| JP | 58-81819 U | | 6/1983 |
|----|------------|---|--------|
| JP | 58-81820 U | | 6/1983 |
| JP | 07-201230 | | 8/1995 |
| JP | 11-66982 | | 3/1999 |
| JP | 2002-140944 | | 5/2002 |
| JP | 2003187561 | * | 7/2003 |
| JP | 2003-249130 A | | 9/2003 |
| RU | 2099806 C1 | | 12/1997 |

* cited by examiner

*Primary Examiner*—Stanley Silverman
*Assistant Examiner*—Kallambella Vijayakumar
(74) *Attorney, Agent, or Firm*—Foley & Lardner LLP

(57) ABSTRACT

There is provided a superconductive cable capable of absorbing an amount of contracting a superconductive wire member in cooling by a simple constitution.

A superconductive cable according to the invention is a cable including a superconductive wire member constituting a superconductive layer (a conductor layer 13, a return line conductor 17) by being wound spirally, a stress relaxation layer (an inner side stress relaxation layer 12, and insulating layer/outer side stress relaxation layer 16) provided on an inner side of the superconductive layer, and a cable constituting member (a former 11) provided on an inner side of the stress relaxation layer. The cable is constituted to absorb an amount of contracting the superconductive layer in accordance with cooling the superconductive wire member by a refrigerant in a diameter direction by the stress relaxation layer.

18 Claims, 3 Drawing Sheets

SUPERCONDUCTIVE CABLE

TECHNICAL FIELD

The present invention relates to a superconductive cable. The invention particularly relates to a direct current superconductive cable capable of absorbing thermal contraction of a superconductive wire member.

RELATED ART

As a superconductive cable, a superconductive cable illustrated in FIG. 4 has been proposed. The superconductive cable 100 is constructed by a constitution of containing 3 cores of cable cores 10 at inside of a heat insinuating tube 20 (refer to, for example, Patent Reference 1, Patent Reference 2).

The cable core 10 includes a former 11, a conductive layer 13, an insulating layer 16A, a shield layer 17A, a protecting layer 18 successively from a center thereof. The conductive layer 13 is constituted by spirally winding a superconductive wire member in multilayers. Normally, there is used a superconductive wire member in a tape-like shape in which a plurality of pieces of filaments comprising an oxide superconductive material are arranged in a matrix of a silver sheath or the like. The insulating layer 16A is constituted by winding insulating paper. The shield layer 17A is constituted by spirally winding a superconductive wire member similar to the conductive layer 13 above the insulating layer 16A. Further, insulating paper or the like is used for the protecting layer 18.

Further, the insulating tube 20 is constructed by a constitution in which an insulating member (not illustrated) is arranged between double tubes comprising an inner tube 21 and an outer tube 22 and inside of the double tubes is vacuumed. A corrosion resistant layer 23 is formed on an outer side of the heat insulating tube 20. Further, a state of use is constituted by a state in which a refrigerant of liquid nitrogen or the like is filled in and circulated through a space formed at inside of the former 11 (in a hollow case) or between the inner tube 21 and the core 10, and the refrigerant is impregnated to the insulating layer 16A.

Patent Reference 1:
Japanese Patent Laid-Open Publication: JP-A-2003-249130 (FIG. 1)
Patent Reference 2:
Japanese Patent Laid-Open Publication: JP-A-2002-140944 (FIG. 2)

DISCLOSURE OF THE INVENTION

Problems to be Solved by the Invention

Meanwhile, according to the above-described superconductive cable, in operating, the superconductive wire member is cooled to an extremely low temperature by the refrigerant to be contracted thereby and therefore, a constitution of absorbing an amount of the contraction is requested. However, there has not been found a simple constitution as a mechanism of absorbing the amount of contraction.

Although according to a constitution including 3 cores of cable cores, a countermeasure of absorbing the amount of contraction by slacking the stranded cores can be devised, in a case of a superconductive cable having a single core, such a countermeasure cannot be adopted. Therefore, it is conceivable to deal therewith by permitting a stress to operate to the superconductive wire member in accordance with contraction in cooling, or sliding a distal end portion of the superconductive cable in accordance with thermal contraction of the cable.

However, in the former case, the stress by contraction is permitted to operate to the superconductive wire member and therefore, there is a case in which depending on a magnitude of the stress, a large tension is produced in the superconductive wire member, the superconductive wire member is deteriorated, or the heat insulating tube is applied with a side pressure at a bent portion of the cable in accordance with contraction of the cable to reduce a heat insulating function. Further, in the latter case, a mechanism for sliding the distal end of the superconductive cable is needed and a large-scaled countermeasure against contraction is liable to be brought about. Particularly, the counter measure against contraction using the sliding mechanism is inappropriate to a long distance superconductive cable line connected with a plurality of superconductive cables by way of joints.

The invention is carried out in view of the above-described situation and it is a principal object thereof to provide a superconductive cable capable of absorbing an amount of contraction of a superconductive wire member in cooling by a simple constitution.

Further, it is another object of the invention to provide a direct current superconductive cable capable of absorbing an amount of contraction of a superconductive wire member in cooling by a simple constitution.

Further, it is other object of the invention to provide a superconductive cable capable of absorbing an amount of contraction of a superconductive wire member in cooling by a simple constitution and also capable of reducing an amount of using a superconductive wire member as less as possible.

Means for Solving the Problems

The invention achieves the above-described object by providing a thermally contracting mechanism of a superconductive layer to a cable core per se.

according to the invention, there is provided a superconductive cable including: a superconductive wire member constituting a superconductive layer by being wound spirally, and a stress relaxation layer provided on an inner side of the superconductive layer, wherein an amount of contraction in a diameter direction of the superconductive layer in accordance with cooling the superconductive wire member by a refrigerant is absorbed by the stress relaxation layer.

By providing the stress relaxation layer on the inner side of the superconductive layer, when the superconductive wire member is contracted by cooling, the superconductive wire member can be avoided from being operated with an excessive tension by absorbing at least a portion of an amount in correspondence with an amount of contracting a diameter of the superconductive layer (an amount by which the diameter of the spirally wound superconductive wire member is reduced by cooling) in accordance with the contraction.

A constituent element of the superconductive cable according to the invention will be explained in details as follows.

The superconductive cable according to the invention is representatively constituted by a cable core and a heat insulating tube containing the cable core. Among them, the cable core is constructed by a basic constitution including a stress relaxation layer, a conductor layer, an insulating layer. Normally, the cable core is provided with a former constituting a cable constituting member. Otherwise, an outer conductor layer (shield layer), a hold wind layer, a cushion layer may be provided.

The former is for holding the conductor layer in a predetermined shape and a strip-like member formed in a pipe-like shape or spirally or a constitution having a structure of a twisted wire can be utilized. As a material thereof, a nonmagnetic metal material of copper, aluminum or the like is preferable. Otherwise, various plastic materials can also be utilized. When the former is constituted by a pipe-like shape, it is preferable to constitute the former by a corrugated tube in consideration of a flexibility. In the case of the former in the pipe-like shape, inside of the former can constitute a flow path of a refrigerant.

The stress relaxation layer is a layer for absorbing an amount of thermally contracting the superconductive layer. The superconductive layer is a layer formed by spirally winding the superconductive wire member and includes a conductor layer or an outer conductor layer (shield layer) as mentioned later. The superconductive layer is thermally contracted by being cooled to an extremely low temperature by the refrigerant in operating the cable. In accordance with thermal contraction of the superconductive wire member, also a contraction in a diameter direction is produced and therefore, when the stress relaxation layer provided on the inner side of the superconductive layer is contracted in correspondence with thermal contraction of the superconductive wire member, the superconductive wire member can be restrained from being operated with an excessive tension.

The stress relaxation layer may be provided with a contraction amount capable of absorbing at least a portion of an amount of contracting the diameter of the superconductive layer when subjected to an extremely low temperature by the refrigerant. That is, the stress relaxation layer may be constituted to absorb the amount of contracting the superconductive layer in the diameter direction in accordance with cooling by the stress relaxation layer and the cable constituting member provided on the inner side of the stress relaxation layer, or may be constituted to absorb the amount of contracting the superconductive layer in the diameter direction in accordance with cooling only by the stress relaxation layer.

In the former case, contraction of the superconductive layer is absorbed by contracting both of the stress relaxation layer and the cable constituting member and therefore, the stress relaxation layer per se can be thinned. As a representative example of the cable constituting member provided on the inner side of the stress relaxation layer, the former is pointed out. In the latter case, the amount of contracting the diameter of the superconductive layer is absorbed by the stress relaxation layer and therefore, a material or a structure of the constituting member on an inner side of the stress relaxation layer, for example, the former can freely be selected.

A location of arranging the stress relaxation layer is disposed on the inner side of the superconductive layer. For example, it is pointed out to provide the stress relaxation layer of the inner side of the conductor layer (on the outer side of the former) as the inner side stress relaxation layer or provide the stress relaxation layer on an inner side of the outer conductor layer (shield layer) as an outer side stress relaxation layer. As the stress relaxation layer provided on the inner side of the outer conductor layer, an insulating layer per se may be utilized, or a stress relaxation layer may separately be formed in addition to the insulating layer. When the insulating layer per se is utilized as the outer side stress relaxation layer, it is not necessary to provide the stress relaxation layer other than the insulating layer to be able to contribute to small diameter formation of the cable core.

As a material constituting the stress relaxation layer, at least one kind of kraft paper, a plastic tape and a composite tape of kraft paper and a plastic tape can preferably be utilized. As the plastic tape, a polyolefin tape, particularly, polypropylene can preferably be utilized. Although kraft paper is normally inexpensive, an amount of contraction by cooling is small, and although a composite tape of kraft paper and polypropylene is expensive, an amount of contraction by cooling is large. Particularly, in the case of the composite tape, when the composite tape having a large thickness of polypropylene is used, a large contraction amount can be ensured, and even when the amount of contracting the diameter of the superconductive wire member is large, the stress relaxation layer without applying an excessive tension to the superconductive wire member can be formed. Otherwise, as kraft paper, crepe kraft paper or humidified kraft paper can ensure a large contraction amount. Further, the stress relaxation layer having a thickness of capable of absorbing at least a portion of the amount of contracting the diameter of the superconductive wire member may be constituted by singles of the materials or combinations thereof.

The conductor layer is a conductor portion constituted by the superconductive wire member. For example, the conductor layer is formed by spirally winding the superconductive wire member on an outer side of the former in multilayers. As a specific example of the superconductive wire member, a superconductive wire member in a tape-like shape in which a plurality of pieces of filaments comprising a Bi2223 species oxide superconductive material is arranged in a matrix of a silver sheath or the like is pointed out. The superconductive wire member may be wound by a single layer or multilayers. Further, when the multilayers are constituted, an interlayer insulating layer may be provided. As the interlayer insulating layer, an interlayer insulating layer provided by winding insulating paper of kraft paper or the like or composite paper of PPLP (made by Sumitomo Denki Kogyo K.K., registered trade mark) or the like is pointed out.

The insulating layer is constituted by an insulating material having insulation withstanding power in accordance with a voltage of the conductor layer. For example, at least one kind of kraft paper, a plastic tape and a composite tape of kraft paper and a plastic tape can preferably be utilized.

In the above-described respective materials, a structure of constituting the insulating layer only by kraft paper is provided with the lowest cost. When a composite tape and kraft paper are compoundedly used, in comparison with a case of constituting an insulating layer only by the composite tape, an amount of using the expensive composite tape can be reduced and cable cost can be reduced.

Particularly, when a composite tape laminated with kraft paper and a polypropylene film is used, it is preferable to use a composite tape having a rate k of a thickness of a polypropylene film to a total of the composite tape of 60% or more. By a difference between resistivities of kraft paper and a polypropylene film constituting the composite tape, an electric field stress is considerably applied on the plastic film excellent in a voltage withstanding characteristic. Therefore, by increasing the rate of the plastic film occupied in the insulating layer, the voltage withstanding characteristic (particularly, direct current voltage withstanding characteristic) of the insulating layer can be improved and the thickness of the insulating layer can be reduced.

Further, when the outer conductor layer, mentioned later, is provided, it is preferable to use the insulating layer per se as the stress relaxation layer. Although the stress relaxation layer may be formed separately from the insulating layer, by utilizing the insulating layer per se as the stress relaxation layer for absorbing the amount of contracting the diameter of the outer conductor layer, an outer diameter of the superconductive cable can be restrained from being increased.

Otherwise, a semiconductor layer may be formed at least one of inner and outer peripheries of the insulating layer, that is, between the conductor layer and the insulating layer, or between the insulating layer and the shield layer. By forming the inner semiconductor layer of the former, and the outer semiconductor layer of the latter, an electric function is effectively stabilized.

The outer conductor layer may be provided on the outer side of the insulating layer. Particularly, in a direct current superconductive cable, the outer conductor layer is a constitution necessary for carrying out power transmission of a single pole system. Although in an alternating current superconductive cable, a shield layer for shielding a magnetic flux leaking to the outer periphery of the conductor layer is needed in order to reduce an alternating current loss of the superconductive wire member, according to the direct current superconductive cable, a return line conductor needs to be constituted by the outer conductor layer at a portion in correspondence with a shield layer of the alternating current superconductive cable. That is, by providing the outer conductor layer (return line conductor) comprising the superconductive wire member on the outer side of the insulating layer, the conductor layer can constitute a forward current flow path in the single pole power transmission and the outer conductor layer can be used as the return line current flow path. The outer conductor layer needs to be constructed by a constitution having a current capacity the same as that of the conductor layer. Further, the superconductive cable can be constituted by a multi core summarized type containing a plurality of cores in the heat insulating tube and a single pole power transmission system or a dual pole power transmission system can also be adopted. In the latter case, the outer conductor layer in the cable of the invention is provided with a function as a neutral line.

It is preferable that a pitch of winding the superconductive wire member constituting the conductor layer or the outer conductor layer is 4 through 6 times as much as a diameter of winding the superconductive wire member. The winding diameter refers to a diameter of a member wound with the superconductive wire member, that is, an inner diameter of a layer constituted by the superconductive wire member. By limiting the rate of the winding pitch to the winding diameter as describe above, it is possible to constitute a short pitch capable of reducing the wire contraction amount when the superconductive wire member is contracted by cooling and constitute a winding pitch capable of restraining also an amount of using the superconductive wire member.

According to an alternating current superconductive cable, in order to reduce an alternating current loss by making currents of respective layers of the superconductive wire member wound in multilayers uniform (uniform current formation), the pitch of winding the superconductive wire member is adjusted at respective layers. For example, a short pitch through along pitch are combined in a range of not deteriorating the superconductive wire member by a history of winding the superconductive wire member and bending the core. Therefore, a restriction on selecting the winding pitch is considerable.

On the other hand, in the case of a direct current superconductive cable, it is not necessary to take uniform current formation into consideration and therefore, the restriction on selecting the winding pitch is inconsiderable, the winding pitch can be selected comparatively freely and all of the layers can also be wound by the same pitch.

When the pitch of winding the superconductive wire member is reduced, the diameter contraction amount when the superconductive wire member is contracted by cooling, that is, an amount to be absorbed by the stress relaxation layer is also reduced and therefore, the stress relaxation layer can easily be formed. However, when the winding pitch is reduced, the amount of using the superconductive wire member is increased to amount to an increase in cost and therefore, it is important to select the winding pitch restraining an increase in the amount of using the superconductive wire member as less as possible. Hence, by limiting the rate of the winding pitch relative to the winding diameter as described above, there can be constituted the superconductive cable by a short pitch capable of reducing the diameter contraction amount when the superconductive wire member is contracted by cooling and by a pitch comparatively restraining also the amount of using the superconductive wire member. A further preferable pitch of winding the superconductive wire member is 5 times as much as the winding diameter.

The preferable winding pitch of the superconductive wire member can trially be calculated as follows. First, there is investigated a relationship between a rate '(pitch/diameter) rate' of the winding pitch to the winding diameter of the superconductive wire member constituting the superconductive layer and the diameter contraction amount in cooling the superconductive wire member. Next, there is investigated a relationship between the '(pitch/diameter) rate' and amount of using the superconductive wire member. Further, there are selected the winding pitch and the winding diameter of the superconductive wire member capable of making the amount of contracting the diameter of the superconductive wire member equal to or smaller than a rectifying value and capable of making an amount of using the superconductive wire member equal to or smaller than a rectified value.

Otherwise, a hold wind layer may be formed on the outer side of the superconductive layer. By forming the hold wind layer on the outer side of the superconductive layer, an operation of fastening the superconductive layer to an inner side can be expected. By the fastening operation, diameter contraction of the superconductive layer can smoothly be made to behave. A material of the hold wind layer may be constituted by a material capable of producing a predetermined fastening force at the superconductive layer, for example, a metal tape, particularly, a copper tape or the like can preferably be utilized.

When the hold wind layer is used, it is also preferable to interpose a cushion layer between the hold wind layer and the superconductive layer. When a metal tape is used for the hold wind layer, normally, also a metal of silver or the like is used for the superconductive wire member, a contact between metals is constituted between the hold wind layer and the superconductive layer and there is a possibility of damaging the superconductive wire member. Therefore, when the cushion layer is interposed between the two layers, the superconductive wire member can be prevented from being damaged by avoiding direct contact of the metals. As a specific material of the cushion layer, insulating paper or carbon paper can preferably be utilized.

Further, it is preferable to provide a protecting layer at an outermost periphery of the cable core. The protecting layer is provided with a function of mechanically protecting the outer conductor layer and insulating from the heat insulating tube. As a material of the protecting layer, insulating paper of kraft paper or the like or a plastic tape can be utilized.

On the other hand, the heat insulating tube may be constituted by any structure so far as the structure is a structure capable of maintaining heat insulation of the refrigerant. For example, there is pointed out a constitution of arranging a heat insulating member between double tubes of a double structure comprising an outer tube and an inner tube and vacuuming an interval between the inner tube and the outer tube. Normally, super insulation laminated with a metal foil and a plastic mesh is arranged between the inner tube and the outer tube. Inside of the inner tube is contained with at lest the conductor layer and filled with the refrigerant of liquid nitrogen or the like for cooling the conductor layer.

The refrigerant can maintain the superconductive wire member in a superconductive state. Although currently, it is most practical to utilize liquid nitrogen for the refrigerant, otherwise, it is conceivable to utilize liquid helium, liquid hydrogen or the like. Particularly, in the case of liquid nitrogen, there can be constituted the superconductive cable constituting insulation by the liquid which does not swell polypropylene, and excellent in a direct current voltage withstanding characteristic or an Imp. voltage withstanding characteristic even when the insulating layer is constituted by a composite tape having a high rate of k, that is, having a large thickness of polypropylene.

The invention is applicable to either of a direct current and an alternating current superconductive cables. Particularly, it is preferable to apply the invention to the direct current superconductive cable in which the restriction on the pitch of winding the superconductive wire member in the superconductive layer is inconsiderable as described above. However, even in the case of the alternating current cable, for example, (1) when the conductor layer and the shield layer are constituted respectively by single layers, (2) although the conductor layer and the shield layer are constituted by multilayers, a necessity of adjusting a pitch is inconsiderable and a preference is intended to be given to a thermal contraction countermeasure, a short pitch can be adopted as the pitch of winding the superconductive wire member. Therefore, even in the case of the alternating current cable, the thermal contraction absorbing mechanism can be provided to the cable core per se.

EFFECTS OF THE INVENTION

According to the superconductive cable of the invention, the following effects can be achieved.
(1) By providing the stress relaxation layer on the inner side of the superconductive layer, when the superconductive wire member is contracted by cooling, at least a portion of an amount in correspondence with the diameter contraction amount of the superconductive layer in accordance with the contraction can be absorbed by the stress relaxation layer. Therefore, the superconductive wire member can be avoided from being operated with an excessive tension and a reduction in the superconductive characteristic can be restrained.
(2) The mechanism of absorbing the amount of thermal contraction can be constituted at the cable core per se by a simple constitution of providing the stress relaxation layer on the inner side of the superconductive layer. Therefore, it is not necessary to adopt a large scale constitution of sliding the distal end portion of the cable or the like while constructing the constitution of capable of firmly absorbing the amount of heat contraction of the superconductive wire member.
(3) By providing the mechanism of absorbing thermal contraction to the cable core per se, the amount of contracting the superconductive wire member can be absorbed not only in the multi core superconductive cable but also the single core superconductive cable which has been conceived to be difficult to provide the conventional absorbing mechanism.
(4) By constituting the stress relaxation layer absorbing the amount of contracting the diameter of the outer conductor layer by the insulating layer per se, it is not necessary to newly form a stress relaxation layer for the outer conductor layer and an increase in the cable diameter can be restrained.
(5) By constituting the pitch of winding the superconductive wire member by 4 through 6 times as much as the winding diameter, there can be constituted the superconductive cable capable of absorbing the amount of contracting the superconductive wire member by a simple constitution and also capable of reducing the amount of using the superconductive wire member as less as possible.
(6) By providing the hold wind layer on the outer side of the superconductive layer, the diameter contraction amount can smoothly be absorbed by the stress relaxation layer by pressing the superconductive layer to the inner peripheral side and making diameter contraction in accordance with thermal contraction of the superconductive wire member behave smoothly.

BRIEF DESCRIPTION OF THE DRAWINGS

FIG. 1 is a cross-sectional view of a superconductive cable according to the invention.
FIG. 2 is a graph showing a relationship between a 'pitch/diameter) ratio' and a diameter contraction amount in cooling a superconductive wire member.
FIG. 3 is a graph showing a relationship between the '(pitch/diameter ratio)' and an amount of using a superconductive wire member.
FIG. 4 is a cross-sectional view of a superconductive cable according to a conventional art.

Figure 1:
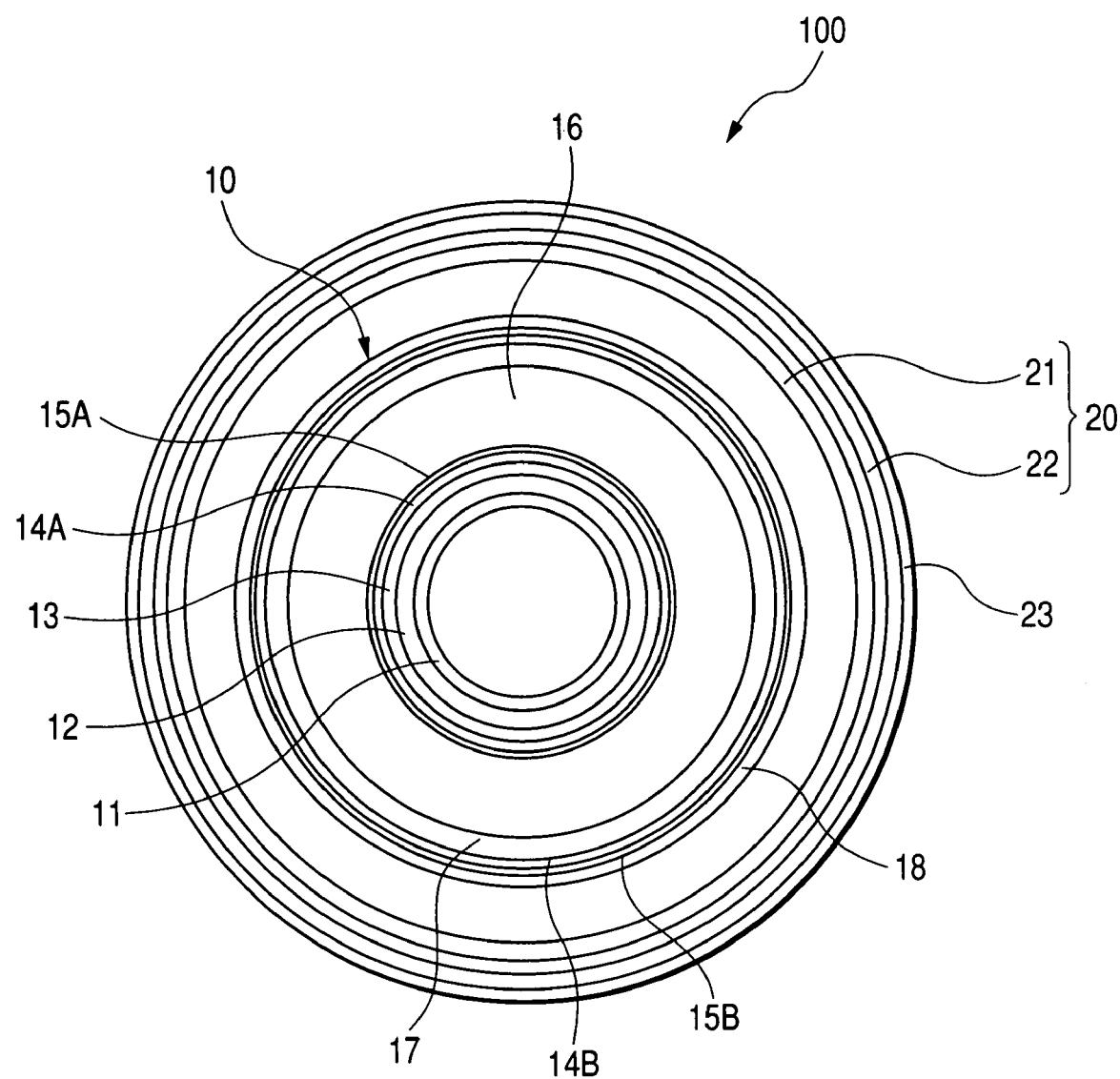
[FIG. 1]

DESCRIPTION OF REFERENCE NUMERALS AND SIGNS 100 direct current superconductive cable
10 core
11 former, 12 inner side stress relaxation layer, 13 conductor layer, 14A, 14B cushion layers, 15A, 15B hold wind layers, 16 insulating layer/outer stress relaxation layer, 16A insulating layer, 17 return line conductor, 17A shield layer, 18 protecting layer
20 heat insulating tube
21 inner tube, 22 outer tube, 23 corrosion resistant layer

BEST MODE FOR CARRYING OUT THE INVENTION

An embodiment of the invention will be explained as follows.

Embodiment 1

[Total Structure]
As shown by FIG. 1, the direct current superconductive cable 100 according to the invention is constituted by a single core of the cable core 10, and the heat insulating tube 20 containing the core 10.

[Core]

The core 10 includes the former 11, the inner side stress relaxation layer 12, the conductor layer 13, the cushion layer 14A, the hold wind layer 15A, the insulating layer (also outer stress relaxation layer) 16, the outer conductor layer (return line conductor 17), the cushion layer 14B, the hold wind layer 15B and the protecting layer 18 successively from a center thereof.

<Former>

A corrugated tube made of stainless steel is used for the former 11. When the hollow former 11 is used, inside thereof can constitute a flow path of a refrigerant (liquid nitrogen in this case).

<Inner Side Stress Relaxation Layer>

The inner side stress relaxation layer 12 is formed by winding a composite tape PPLP (registered trade mark) made by Sumitomo Denki Kogyo K.K. constituted by laminating kraft paper and a polypropylene film on the former 11. Here, a material and a thickness thereof capable of absorbing a diameter contraction amount in cooling the conductor layer 13, mentioned later, are selected. Further specifically, there is used PPLP having a rate k of a thickness of a polypropylene film to a thickness of a total of the composite tape of 60%.

<Conductor Layer>

A Bi2223 species Ag—Mn sheathed tape wire member having a thickness of 0.24 mm, a width of 3.8 mm is used for the conductor layer 13. The conductor layer 13 is constituted by winding the tape wire member on the inner side stress relaxation layer 12 in multilayers. Here, the superconductive wire member is wound thereon in 4 layers.

<Cushion Layer and Hold Wind Layer>

The cushion layer 14A is formed on the conductor layer 13 and the hold wind layer 15A is formed further thereon. The cushion layer 14A is constituted by winding several layers of kraft paper on the conductor layer, and the hold wind layer 15A is constituted by winding a copper tape. The cushion layer 14A avoids contact between metals by the conductor layer and the hold wind layer 15A, and the hold wind layer 15A makes diameter contraction of the conductor layer 13 in cooling behave smoothly by fastening the conductor layer 13 to an inner peripheral side by way of the cushion layer 14A.

<Insulating Layer/Outer Stress Relaxation Layer>

The insulating layer 16 is formed on the hold wind layer 15A. Here, the insulating layer 16 is constituted by PPLP having the rate k of 60%. The insulating layer 16 is provided with a function of electrically insulating the conductor layer 13 and is provided with also a function as the outer stress relaxation layer for absorbing a diameter contraction amount in accordance with cooling an outer conductor layer, mentioned later. By constituting the outer stress relaxation layer by the insulating layer 16 per se, it is not necessary to separately form an outer stress relaxation layer and an outer diameter of the cable core can be restrained from being increased.

Further, although not illustrated, an inner peripheral side of the insulating layer is formed with an inner semiconductor layer and an outer peripheral side thereof is formed with an outer semiconductor layer. Either of the semiconductor layers is formed by winding carbon paper.

<Outer Conductor Layer (Return Line Conductor)>

The outer conductor layer (return line conductor 17) is provided on an outer side of the insulating layer 16. In direct current, a reciprocating flow path of a current is needed and therefore, the return line conductor 17 is provided in single pole power transmission to be utilized as a flow path of a return current. The return line conductor 17 is constituted by a superconductive wire member similar to the conductor layer 13 and is provided with a power transmission capacity similar to that of the conductor layer 13.

<Cushion Layer and Hold Wind Layer>

Successively, the cushion layer 14B is formed on the outer conductor layer, and the hold wind layer 15B is formed further thereon. The cushion layer 14B and the hold wind layer 15B are constituted by materials similar to those of the cushion layer 14A and the hold wind layer 15A provided on the outer side of the conductor layer 13. The cushion layer 14B avoids contact between metals by the return line conductor 17 and the hold wind layer 15B and makes diameter contraction of the return line conductor 17 behave smoothly by fastening the return line conductor 17 to an inner peripheral side by way of the cushion layer 14B.

<Protecting Layer>

An outer side of the return line conductor 17 is provided with the protecting layer 18 constituted by an insulating material. Here, the protecting layer 18 is constituted by winding kraft paper. By the protecting layer 18, the return line conductor 17 can be protected mechanically, the heat insulating tube (inner tube 21) can be insulated, and the return current can be prevented from being shunted to the heat insulating tube 20.

[Insulating Tube]

The heat insulating tube 20 comprises the double tubes including the inner tube 21 and the outer tube 22 and a vacuum heat insulating layer is constituted between the inner and the outer tubes 21, 22. Inside of the vacuum heat insulating layer is arranged with so-to-speak super insulation laminated with a plastic mesh and a metal foil. A space formed between the inner side of the inner tube 21 and the core 10 constitutes a flow path of the refrigerant. Further, the corrosion resistant layer 23 may be formed at an outer periphery of the heat insulating tube 20 by polyvinyl chloride or the like as necessary.

(Trial Calculation Example)

Next, in fabricating the superconductive cable, the following trial calculation is carried out such that an amount of using the superconductive wire member can be made to be as small as possible while aiming at short pitch formation of the superconductive wire member such that the diameter contraction amount can be made to be as small as possible.

Figure 2:
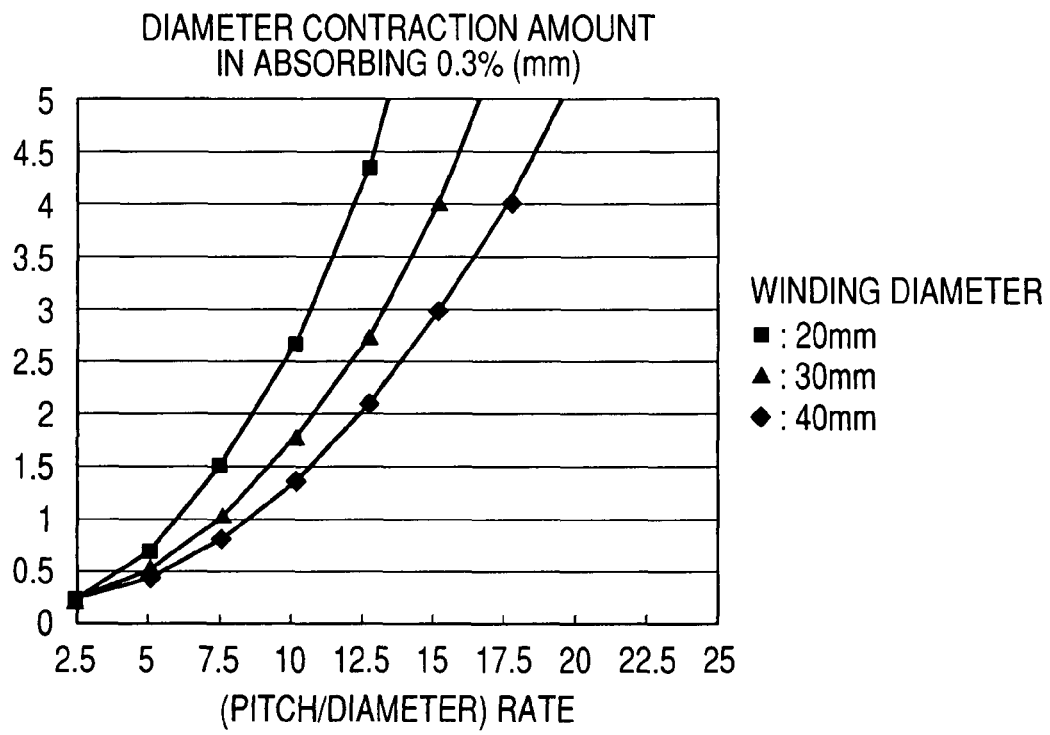
[FIG. 2]

First, there is investigated a relationship between a rate of a pitch of winding and a diameter of winding the superconductive wire member constituting the superconductive layer '(pitch/diameter) ratio' and an amount of contracting a diameter of the superconductive wire member. Here, the winding diameter is constituted by 3 ways of 20 mmΦ, 30 mmΦ, 40 mmΦ and the diameter contraction amount when the superconductive wire member is contracted by 0.3% by cooling in operating is trially calculated by using linear expansion coefficients of respective materials. A result thereof is shown in a graph of FIG. 2.

As shown by the graph, when the '(pitch/diameter) rate' stays the same, it is known that the larger the winding diameter, the smaller the diameter contraction amount. Further, it is also known that when the winding diameter stays the same, the smaller the '(pitch/diameter) rate', the smaller the diameter contraction amount. It is known from the result that the diameter contraction amount to be absorbed is small when a short pitch is selected.

Figure 3:
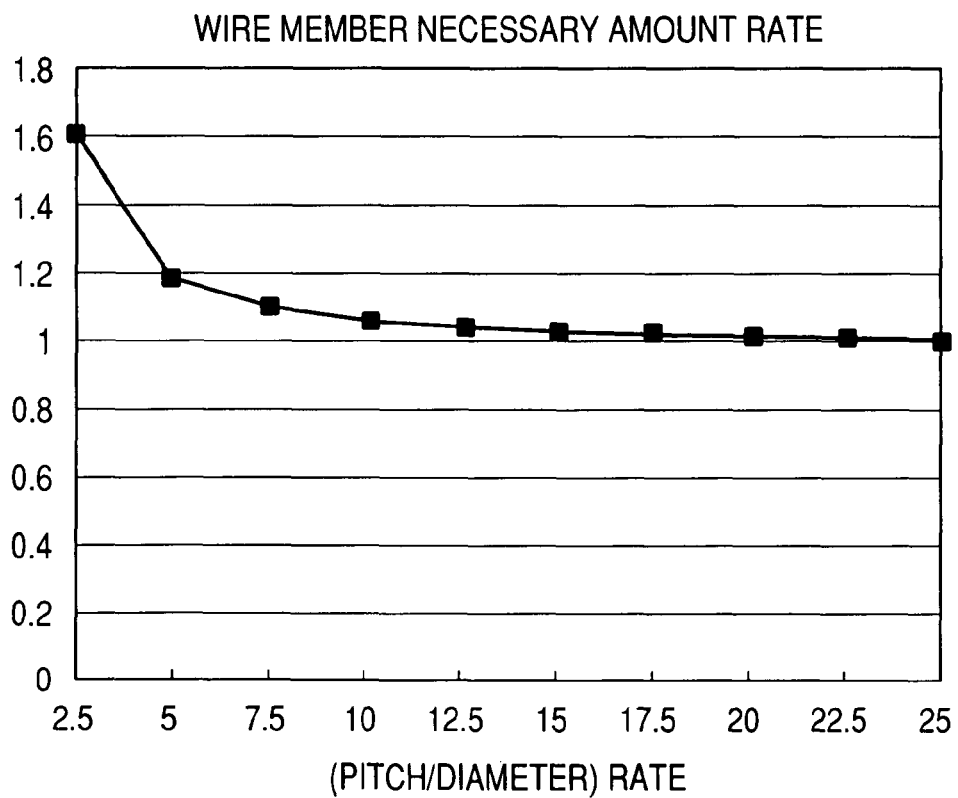
[FIG. 3]
Figure 4:
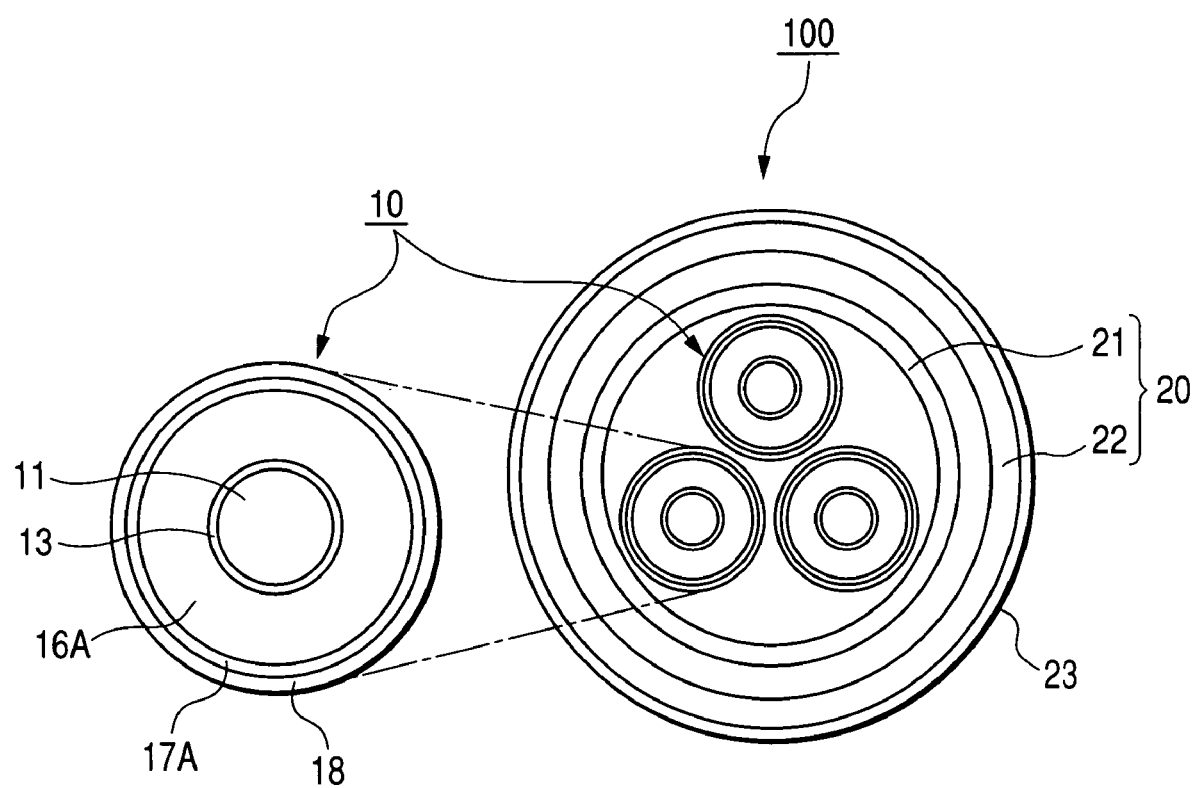
[FIG. 4]

Next, a relationship between the '(pitch/diameter) rate' and an amount of using the superconductive wire member is investigated. Here, an amount of using the superconductive wire member when the superconductive wire member is made to be along a longitudinal direction of an object to be wound, that is, when the superconductive wire member is made to be longitudinally in line therewith is made to constitute 1.0 and it is shown how the amount of using the superconductive wire member is changed when the '(pitch/diameter) rate' is changed by a relative value. A result thereof is shown in a graph of FIG. 3.

As shown by the graph, it is known that although the amount of using the superconductive wire member is not extremely increased up to the '(pitch/diameter) rate' of about 6.0, the amount of using the superconductive wire member is rapidly increased when the rate becomes less than 4.0.

It is known from the two results of trial calculation that the '(pitch/diameter) rate' may be made to be about 4.0 through 6.0 when a contraction amount of the superconductive wire member in cooling is made to be a degree of being absorbed easily and also the amount of using the superconductive wire member is made to be small.

Table 1 summarizes constituent materials and dimensions of respective portions of the superconductive cable (50 kV, 10000 A) according to the invention designed based on the result of trial calculation. Further, pitches of winding the superconductive wire members of the conductor layer and the outer conductor layer are 5 times as much as the winding diameters. That is, the pitches are 210 mm in the conductor layer and about 274 mm in the outer conductor layer.

TABLE 1

| constituent member | material | outer diameter(mm) etc |
|---|---|---|
| former | stainless steel corrugated tube | 30 |
| inner side stress relaxation layer | PPLP | 42 (thickness: 6 mm) |
| conductor layer | Bi2223 species superconductive wire member | 46.4 (4 layers) |
| cushion layer/hold wind layer | kraft paper/copper tape | 47.4 |
| insulating layer/outer side stress relaxation layer | PPLP | 54.7 (thickness: 3 mm) |
| outer conductor layer | Bi2223 species superconductive wire member | 57.5 (3 layers) |
| cushion layer/hold wind layer | kraft paper/copper tape | 59.5 |
| protecting layer | kraft paper | 61.7 (thickness 1 mm) |
| cable outer diameter | | 116 |

In the constitution of Table 1, also a diameter of the former per se is contracted by cooling. When a contraction rate thereof in cooling is made to be 0.3%, the amount of contacting the diameter of the former becomes 0.09 mm. On the other hand, the amount of contracting the diameter of the superconductive wire member by the contraction rate of 0.3% is 0.45 mm under conditions of the winding diameter of 42 mm, the winding pitch of 210 mm. Therefore, it is known that 20% of the amount of contracting the diameter of the conductor layer can be absorbed only by the amount of contracting the diameter of the former. Therefore, it is known that when the amount of contracting the diameter of the inner side stress relaxation layer is 0.36 mm, 100% of the amount of contracting the diameter of the conductor layer can be absorbed by a total diameter contraction amount of the former and the inner side stress relaxation layer. Further, it is known that when the inner side stress relaxation layer having the diameter contraction amount of 0.45 mm, a total of the amount of contracting the diameter of the conductor layer can be absorbed only by the inner side stress relaxation layer.

Although an explanation has been given in details and in reference to the specific embodiment, it is apparent for the skilled person that the invention can variously be changed or modified without deviating from the spirit and the range of the invention.

Further, the application is based on Japanese Patent Application (Japanese Patent Application No. 2004-350327) filed on Dec. 2, 2004 and a content thereof is incorporated herein by reference.

INDUSTRIAL APPLICABILITY

The superconductive cable according to the invention can be utilized as power transmitting means. The superconductive cable according to the invention can particularly be utilized preferably as single core direct current power transmitting means.

The invention claimed is:

1. A superconductive cable comprising:
a core;
a superconductive wire member constituting a superconductive layer by being wound spirally; and
a stress relaxation layer provided on an inner side of the superconductive layer, wherein
the stress relaxation layer is provided on the core and the superconductive layer is wound onto the stress relaxation layer, and wherein
an amount of contraction in a diameter direction of the superconductive layer in accordance with cooling the superconductive wire member by a refrigerant is absorbed by the stress relaxation layer.

2. The superconductive cable according to claim 1, further comprising:
a cable constituting member provided on an inner side of the stress relaxation layer, wherein
the amount of contraction in the diameter direction of the superconductive layer in accordance with cooling the superconductive wire member by the refrigerant is absorbed by the stress relaxation layer and the cable constituting member.

3. The superconductive cable according to claim 1, wherein
the superconductive layer includes: a conductor layer, and the stress relaxation layer includes an inner side stress relaxation layer formed on an inner side of the conductor layer.

4. The superconductive cable according to claim 3, wherein
at the stress relaxation layer, an insulating layer provided on an outer side of the conductor layer is utilized as an outer side stress relaxation layer, and
the superconductive layer includes an outer conductor layer formed on an outer side of the insulating layer.

5. The superconductive cable according to claim 1, wherein
a pitch of winding the superconductive wire member is 4 through 6 times as much as a diameter of winding the superconductive wire member.

6. The superconductive cable according to claim 1, wherein
the cable constituent member includes a former, and
the former is either of a corrugated tube and a spiral strip-like member.

7. The superconductive cable according to claim 1, wherein the stress relaxation layer is constituted by at least one kind of kraft paper, a plastic tape and a composite tape of the kraft paper and the plastic tape.

8. The superconductive cable according to claim 1, further comprising:

a hold wind layer on an outer side of the superconductive layer.

9. The superconductive cable according to claim 1, wherein the superconductive cable is a direct current superconductive cable.

10. A superconductive cable comprising:

a superconductive wire member constituting a superconductive layer by being wound spirally; and a stress relaxation layer provided on an inner side of the superconductive layer, wherein the superconductive layer comprises a single portion of conductive tape wound onto the stress relaxation layer, and wherein an amount of contraction in a diameter direction of the superconductive layer in accordance with cooling the superconductive wire member by a refrigerant is absorbed by the stress relaxation layer.

11. The superconductive cable according to claim 10, further comprising:

a cable constituting member provided on an inner side of the stress relaxation layer, wherein the amount of contraction in the diameter direction of the superconductive layer in accordance with cooling the superconductive wire member by the refrigerant is absorbed by the stress relaxation layer and the cable constituting member.

12. The superconductive cable according to claim 10, wherein the superconductive layer includes: a conductor layer, and the stress relaxation layer includes an inner side stress relaxation layer formed on an inner side of the conductor layer.

13. The superconductive cable according to claim 12, wherein at the stress relaxation layer, an insulating layer provided on an outer side of the conductor layer is utilized as an outer side stress relaxation layer, and the superconductive layer includes an outer conductor layer formed on an outer side of the insulating layer.

14. The superconductive cable according to claim 10, wherein a pitch of winding the superconductive wire member is 4 through 6 times as much as a diameter of winding the superconductive wire member.

15. The superconductive cable according to claim 10, wherein the cable constituent member includes a former, and the former is either of a corrugated tube and a spiral strip-like member.

16. The superconductive cable according to claim 10, wherein the stress relaxation layer is constituted by at least one kind of kraft paper, a plastic tape and a composite tape of the kraft paper and the plastic tape.

17. The superconductive cable according to claim 10, further comprising:

a hold wind layer on an outer side of the superconductive layer.

18. The superconductive cable according to claim 10, wherein the superconductive cable is a direct current superconductive cable.

* * * * *